United States Patent [19]

Husher

[11] Patent Number: 4,954,776

[45] Date of Patent: Sep. 4, 1990

[54] LINEAR DISPLACEMENT TRANSDUCERS UTILIZING VOLTAGE COMPONENT IN PHASE WITH CURRENT THAT VARIES LINEARLY WITH CORE DISPLACEMENT

[75] Inventor: Stephen Husher, Fordingbridge, United Kingdom

[73] Assignee: Penny & Giles Controls Limited, Dorset, United Kingdom

[21] Appl. No.: 313,034

[22] Filed: Feb. 21, 1989

[30] Foreign Application Priority Data

Apr. 22, 1988 [GB] United Kingdom ................. 8809575

[51] Int. Cl.$^5$ .............................................. G01B 7/14
[52] U.S. Cl. ............................ 324/20716; 324/207.24
[58] Field of Search .............. 324/207, 208, 224, 236, 324/207.13, 207.14, 206.15, 207.16, 207.23, 207.24; 336/45, 55, 221; 340/870.31

[56] References Cited

U.S. PATENT DOCUMENTS

| | | | |
|---|---|---|---|
| 3,651,398 | 3/1972 | Urmenyi | 324/224 |
| 3,654,549 | 4/1972 | Maurer et al. | 324/224 X |
| 3,891,918 | 6/1975 | Ellis | 324/208 |
| 4,042,876 | 8/1971 | Visioli, Jr. | 324/207.16 |
| 4,115,923 | 9/1978 | Smith et al. | 324/208 X |
| 4,284,961 | 8/1981 | Landau | 324/208 X |

OTHER PUBLICATIONS

"Transducer Technology... The Journal for the Measurement and Systems Engineer", Apr. 1989, pp. 11-13.

Primary Examiner—Reinhard J. Eisenzopf
Assistant Examiner—Warren S. Edmonds
Attorney, Agent, or Firm—Lewis H. Eslinger; Jay H. Maioli

[57] ABSTRACT

A linear displacement transducer comprises a winding, a magnetic core which is linearly displaceable relatively to the winding, and a source for energizing the winding with a constant RMS alternating current at a frequency sufficiently high for the resistive losses in the magnetic core to cause the voltage across the winding to vary substantially linearly relative to the linear displacement of the magnetic core. The frequency may, for example, be in the range 10 to 20 kHz, and a temperature sensing winding may be associated with the winding to enable the output from the transducer to be compensated for temperature changes, or the winding may be used in time-division multiplex for this purpose.

6 Claims, 3 Drawing Sheets

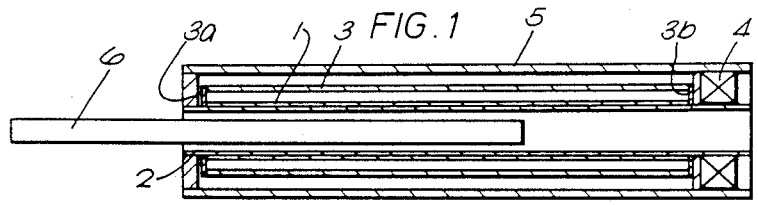
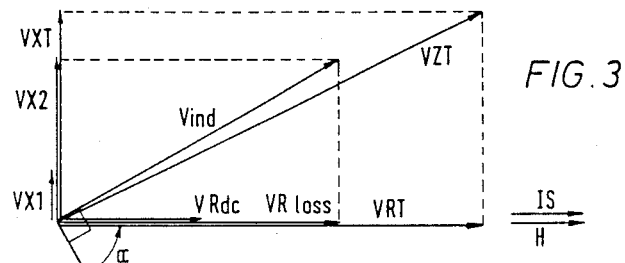
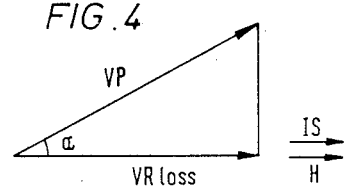
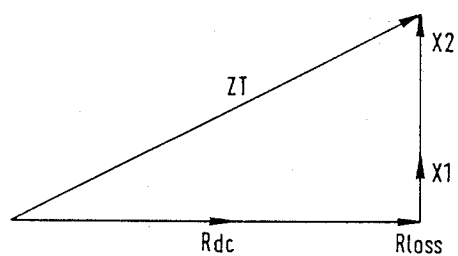
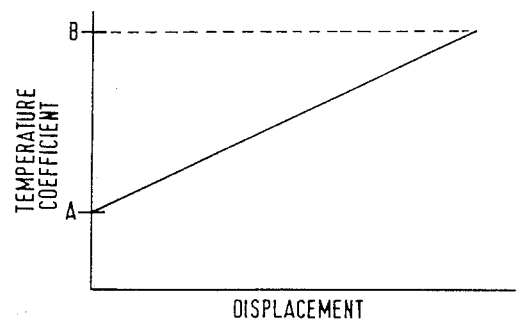

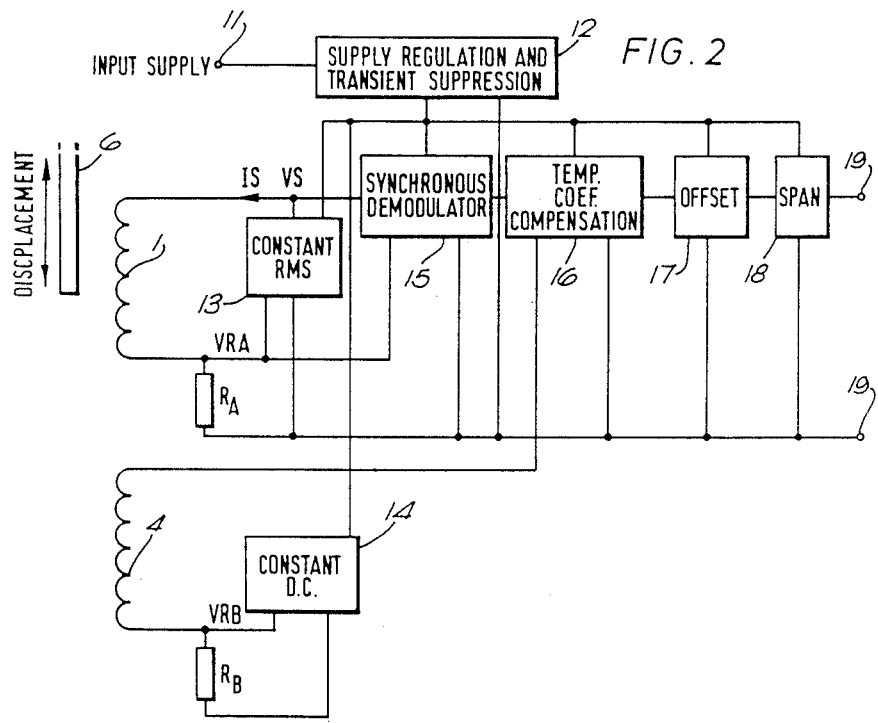
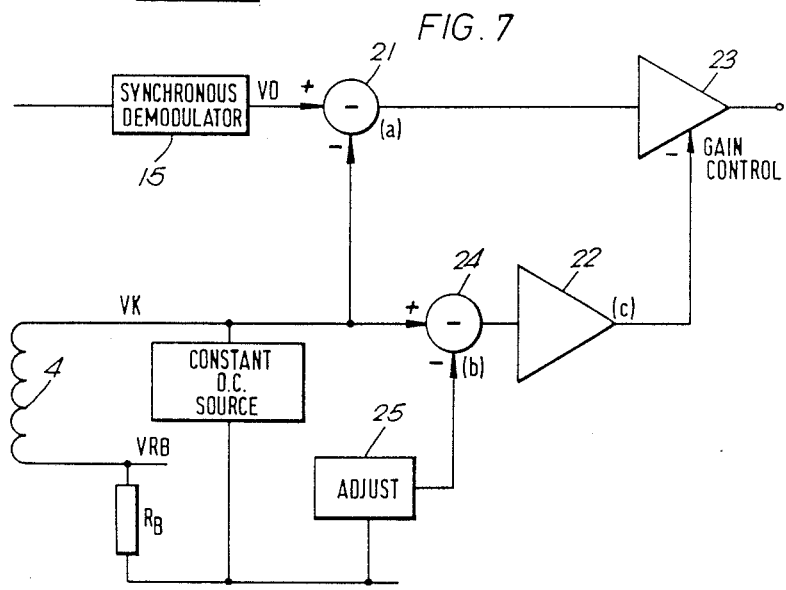

LINEAR DISPLACEMENT TRANSDUCERS UTILIZING VOLTAGE COMPONENT IN PHASE WITH CURRENT THAT VARIES LINEARLY WITH CORE DISPLACEMENT

BACKGROUND OF THE INVENTION

1. Field of the Invention

This invention relates to linear displacement transducers.

2. Description of the Prior Art

Such transducers are used to provide an electrical output signal which varies with linear displacement of a mechanical element. Thus, for example, the output signal may vary in dependence on the position of a piston relative to a cylinder in a hydraulic actuator.

SUMMARY OF THE INVENTION

One object of the present invention is to provide a linear displacement transducer which supplies a voltage output which varies substantially linearly relative to a displacement to be measured.

Another object of the present invention is to provide a linear displacement transducer comprising a winding fed with a constant RMS current, and means to derive a voltage output proportional to a displacement to be measured from across the winding.

According to the present invention there is provided a linear displacement transducer comprising:

a winding;

a magnetic core which is linearly displaceable relative to said winding; and means for energizing said winding with a constant RMS alternating current of a frequency sufficiently high for the losses in said magnetic core to cause the voltage across said winding in phase with the current to vary substantially linearly relative to the linear displacement of said magnetic core.

The winding may be a single layer helical winding wound on a straight tubular former. The magnetic core may be a straight cylindrical metal rod which penetrates axially into the interior of the tubular former to an extent dependent on the linear displacement of a mechanical element, to which the rod may be directly secured, and the position of which is to be monitored by the transducer.

The frequency of the alternating current may be in the range 10 to 20 kHz. If a frequency lower than 10 kHz is used, then the inductive reactance of the magnetic core may become dominant over the resistive losses, and the voltage across the winding in phase with the current does not then vary substantially linearly relative to the linear displacement of the magnetic core. If a frequency higher than 20 kHz is used, then the circuitry necessary to measure the voltage across the winding becomes relatively expensive.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 is a cross-section of part of an embodiment of linear displacement transducer according to the present invention;

FIG. 2 is a block circuit diagram of the embodiment;

FIGS. 3 to 5 are vector diagrams;

FIG. 6 is a graph of temperature coefficient against displacement;

FIG. 7 shows part of the block circuit diagram of FIG. 2 in more detail;

DESCRIPTION OF THE PREFERRED EMBODIMENTS

Figure 8:
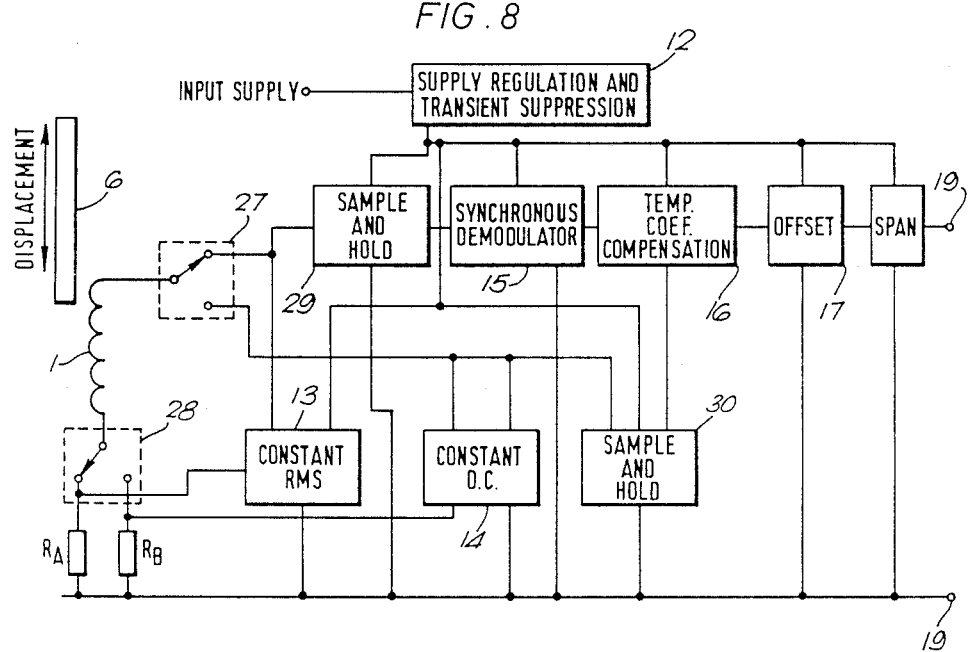
FIG. 8 shows a block circuit diagram of a modified embodiment.

Referring to FIG. 1, the embodiment of transducer comprises a single layer longitudinally-extending helical winding 1 wound on a straight tubular former 2 made of stainless steel. The winding 1 is impregnated with resin and encircled by a tubular magnetic screen 3 made of suitable screening material such as nickel iron alloy and having radial end pieces 3a and 3b. A relatively short temperature sensing winding 4 is wound on the former 2 adjacent to one end of the winding 1 and beyond the end piece 3b. The elements 1 to 4 may be enclosed in a cylindrical metal case 5 for protection. A magnetic core 6 in the form of a cylindrical metal rod made of high permeability material such as nickel iron alloy penetrates axially into the interior of the former 2, in which it is a loose sliding fit, to an extent dependent on the linear displacement of a mechanical element, such as a piston of a hydraulic actuator, to which the core 6 is fixed. The core 6 may be up to 20% longer than the winding 1. At one extreme position, the core 6 may penetrate up to 95% of the full length of the winding 1, while at the other extreme position the core 6 may penetrate up to 10% of the full length of the winding 1.

Referring to FIG. 2, the circuit of the embodiment comprises an input supply terminal 11 by way of which a power source is connected to a supply regulation and transient suppression circuit 12 from which supplies are provided for a constant RMS current generator 13 of frequency 10 to 20 kHz, a constant direct current generator 14, a synchronous demodulator 15, a temperature coefficient compensation circuit 16, an offset adjustment circuit 17 and a span adjustment circuit 18. Although not shown, the supply circuit 12 may provide a split-rail supply for the temperature coefficient compensaion circuit 16 and the elements to the left thereof in FIG. 2, and a single-rail supply for the remaining elements. The output of the RMS generator 13 is connected across the series combination of the winding 11 and a resistor RA. The output of the dc generator 14 is connected across the series combination of the temperature sensing winding 4 and a resistor RB. The required output is derived by the synchronous demodulator 15, and is supplied to the series-connected temperature coefficient compensation circuit 16, offset adjustment circuit 17 and span adjustment circuit 18, to provide a, final output across terminals 19.

In operation, a constant RMS alternating current IS with a sinusoidal waveform is applied across the series combination of the winding 1 and the resistor RA. As the voltage VRA across the resistor RA is in phase with the current !S, it is used as a synchronization signal for the synchronous demodulator 15. Displacement of the core 6 within the winding 1 affects the impedance of the winding 1, and as the impedance varies the voltage VS developed across the series combination of the winding 1 and the resistor RA varies consequentially, due to the constant current nature of the supply. The voltage VS is phase shifted from the current IS, and the voltage vector in phase with the current IS is linearly proportional to the linear displacement of the core 6.

Referring now to FIG. 3, this is a vector diagram showing the voltages associated with the winding 1, with the current IS being taken as the reference vector and with the core 6 in a fixed position. The references used in FIG. 3 are as follows:

VX1: the reactive part of the voltage across the winding 1 due to the inductive reactance of the winding 1
VX2: the reactive part of the voltage induced across the winding 1 due to the presence of the core 6
VXT: the total reactive voltage across the winding 1 (VX1+VX2)
VRdc: the voltage across the winding 1 due to the dc resistance of the winding 1
VRloss: the resistive part of the voltage induced across the winding 1 due to losses within the core material 6
VRT: the total resistive voltage across the winding 1 (VRdc+VRloss)
H: the magnetic field
B (Φ): the magnetic flux
α: the loss angle associated with the magnetic material of the core 6 (H-B)
Vind: the total induced voltage due to the presence of the core 6 (vector sum of VRloss+VX2)
VZT: the voltage across the winding 1 due to the total impedance (vector sum of VRT+VXT).

With the core 6 in a fixed position, the current IS has associated with it the magnetic field H which is in phase with the current IS. Due to the high frequency of the current IS, the magnetic flux B (Φ) lags the current IS by the angle α. This developed magnetic flux B (Φ) then induces the voltage Vind in the winding 1, which is at 90° to the magnetic flux B (Φ), and this induced voltage Vind is added to the initial voltages VX1 and VRdc to give the total voltage VZT across the winding 1. This total voltage VZT is not in phase with the current IS, but is related to the voltages VXT and VRT. As the core 6 moves within the winding 1 the amount of high permeability magnetic material within the winding 1 varies, so the magnetic flux B (Φ) changes. As the magnetic flux B (Φ) increases, so the induced voltage Vind will increase and therefore the total voltage VZT will increase.

It is found that the voltage in phase with the current IS varies substantially linearly with respect to movement of the core 6. This in-phase voltage variation is due to the induced voltage VRloss. As the voltage VRloss in phase with the current IS is substantially linear with displacement of the core 6, the synchronous demodulator 15 can be used to demodulate the voltage signal derived from across the winding 1. The synchronous demodulator 15 will derive a dc voltage proportional to the in-phase component VRloss.

Referring to FIG. 4 which shows the vector relationship between VRloss and VP, the peak voltage, the output of the synchronous demodulator 15 is given by:

$$2V_{p}\cos \alpha/\pi$$

that is:

$$2VRloss/\pi$$

Corresponding to FIG. 3, the final impedance triangle is as shown in FIG. 5. As previously mentioned, the resistive voltage term VRT is linear with core displacement, whereas the inductive voltage term VXT is not linear. The inductive leg of the triangle of FIG. 5 exerts its non-linear effect on the total impedance ZT. It is possible to reduce the effect of the inductive leg on the total impedance ZT by increasing the resistive leg Rdc+Rloss. This can be achieved by increasing the value of the resistor RA which forms a current feedback resistor. Having increased the value of the resistor RA, the voltage VZT can be measured as an RMS value with no need for synchronous demodulation, and will be found to vary substantially linearly with core displacement. The value of the resistor RA may typically be about four times the dc resistance of the winding 1.

The operation of the temperature coefficient circuit 16 will now be described. The temperature coefficient of the transducer if no compensation is provided will generally be rather poor, as indicated in FIG. 6, in which the temperature coefficient is shown as varying from A at zero displacement of the core 6 to B at maximum displacement.

The temperature coefficient can be minimized using the resistor RA. If there were no resistor RA, then the temperature coefficient with the core 6 at zero displacement would be due to the winding 1 only. The change ΔRcoil of the resistance of the winding 1 would be given by:

$$Rcoil.TW.\Delta T/10^6$$

where:
Rcoil is the resistance of the winding 1
TW is the temperature coefficient of the wire of the winding 1 in ppm/°C.
ΔT is the temperature rise in °C.

With the resistor RA in the circuit, the temperature coefficient is due to the resistance not only of the winding 1, but also of the resistor RA as follows:

$$\Delta RT = Rcoil.TW.\Delta T/10^6 + RA.TR.\Delta T/10^6$$

where:
TR is the temperature coefficient of RA
ΔRT is the overall temperature coefficient
If RA=Rcoil for example:

$$\Delta RT = Rcoil.TW.\Delta T/10^6 + Rcoil.TR.\Delta T/10^6$$

$$\Delta RT = Rcoil.\Delta T(TW+TR)/10^6$$

The total resistance is now 2Rcoil therefore:

$$\Delta R = 2Rcoil.\Delta T(TW+TR/2)/10^6$$

As RA will normally have a temperature coefficient of 50 ppm/°C. and Rcoil a coefficient of 3900 ppm/°C. the resulting coefficient would be:

$$R = (2*Rcoil*\Delta T/10^6)*(1975)$$

A considerable reduction from 3900 ppm/°C. to 1975 ppm/°C. has therefore been achieved. The effect of the resistor RA is therefore such that the offset temperature coefficient A has been reduced, but the temperature coefficient would still vary over the stroke length.

Referring to FIG. 7, which shows part of the circuit of FIG. 2 in more detail, there are two stages involved in the temperature coefficient compensation, these being removal of the temperature coefficient offset (A in FIG. 6), and then adjustment of the gain with temperature to eliminate changes in the temperature coefficient over the displacement range of the core 6. The temperature coefficient is first minimized by suitable selection of the value of the resistor RA in series with the winding 1. This results in an overall coefficient which has the same form as FIG. 6, but with the offset A reduced in magnitude. Removal of the temperature coefficient offset will be described first. The temperature sensing coil 4 is in series with the resistor RB to form a series combination which is supplied with a constant dc. The voltage VB developed across the resistor RB provides a feedback signal to maintain the current at a constant level. The voltage VK developed across this series combination varies with temperature, and is taken to be the offset voltage. The rate at which the voltage VK changes with temperature is dependent on the dc resistance of the resistor RB and of the temperature sensing coil 4. The temperature sensing coil 4 typically has a temperature coefficient of 3900 ppm/°C., whilst that of the resistor RB is typically 50 ppm/°C., so by selection of suitable values any temperature coefficient is possible between 50 ppm/°C. and 3900 ppm/°C. (this method of temperature coefficient selection is similar to that explained earlier for the resistor RA and the winding 1). Resistance values for the resistor RB and the temperature sensing coil 4 are selected such that the combined temperature coefficient exactly matches the coefficient offset (A in FIG. 6). The actual value of the voltage VK can be changed by adjustment of the current supplied by the constant dc source 14 and is therefore made to be exactly the same as the voltage output of the synchronous demodulator 15 when the core 6 is at zero displacement. The output signal (a) from a subtractor 21, which is equal to VD-VK, where VD is the demodulator output, results in an overall temperature coefficient of 0 ppm/°C. at zero displacement. However, at this stage the gain of the transducer would still vary with temperature, and in consequence the gain must be adjusted with temperature to remove the change of coefficient over the displacement range. The voltage VK is adjusted at the subtractor 24 by subtracting a fixed voltage (b) set by an adjustment circuit 25, so that the offset previously set by the constant dc source 14 is removed. This then allows a higher gain to be applied by the next stage without going out of range. Gain is then applied by an amplifier 22 to increase the sensitivity, and the output signal (c) of the amplifier 22 is used to control the gain of an amplifier 23 through which the signal (a) is passed. With increase in temperature, the effect of the signal (c) is to reduce the gain of the amplifier 23 at the same rate that the gain of the transducer is increasing, so that the transducer is then compensated for changes in temperature at all points in the core displacement.

Finally, with reference to FIG. 2, the output from the temperature coefficient compensation circuit 16 is passed to the offset adjustment circuit 17 and the span adjustment circuit 18. The transducer may be required to operate between defined limits such as 0.5 volts at zero displacement of the core 6, to 10.5 volts at full displacement of the core 6. The offset adjustment circuit 17 adjusts the output of the transducer to be 0.5 volts at zero displacement of the core 6. The span adjustment circuit 18 then adjusts the gain of the circuit such that at full displacement of the core 6 the output is set to 10.5 volts.

It will be apparent that various modifications can be made to the configuration, materials and circuitry used, without departing from the present invention. For example, the temperature sensing winding 4 may be eliminated if the winding 1 is used both for displacement measurement of the core 6, and for temperature compensation.

FIG. 8 shows the modified circuit required, comprising the winding 1 which can be supplied via a switch 27 with either a constant RMS current from the RMS source 13 or a constant direct current from the constant direct current generator 14. Moreover, the winding 1 can either be in series with the resistor RA or the resistor RB under control of a switch 28. The switches 27 and 28 are interconnected such that if the switch 27 is set to the RMS source 13, then switch 28 selects the resistor RA, and conversely if the switch 27 is set to the dc source 14, then the switch 28 selects the resistor RB.

The output developed across the winding 1 and the resistor RA is fed to a sample/hold circuit 29, and this output is then processed by the synchronous demodulator 15, the temperature coefficient compensation circuit 16, the offset adjustment circuit 17, and the span adjustment circuit 18, the output being developed across the terminals 19. The output developed across the winding 1 and the resistor RB is fed to a sample/hold circuit 30 and this output is then processed by the temperature coefficient compensation circuit 16.

Figure 9:
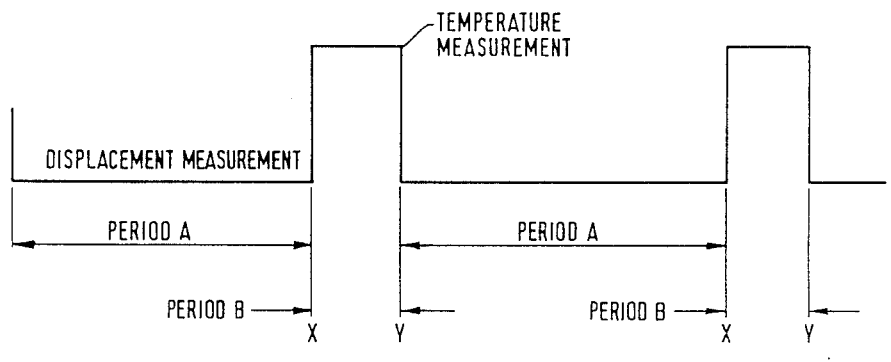
FIG. 9 is a diagram for explaining the operation of the embodiment of FIG. 8.

The circuit operates as follows, with reference to FIG. 9. The winding 1 is operated in time-division multiplex, so that for a period A the winding 1 and the resistor RA are energized by the constant RMS current through the switches 27 and 28. The sample/hold circuit 29 then passes a signal which is processed by the synchronous demodulator 15, the temperature coefficient compensation 16, the offset adjustment circuit 17 and the span adjustment circuit 18 as previously described.

At point X, the sample/hold circuit 29 is set to hold, so that the value of displacement is held whilst temperature sensing is performed.

The switches 27 and 28 are then switched, so that the constant direct current is supplied across the winding 1 and the resistor RB. The sample/hold circuit 30 then derives a signal to be passed to the temperature coefficient compensation 16 for processing as described above.

At point Y, the sample/hold circuit 30 is set to hold, so that temperature compensation is held while the displacement sensing is again performed.

Operation continues in this time-division multiplex manner.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:
1. A linear displacement transducer comprising:
   a winding;
   a magnetic core which is linearly displaceable relative to said winding; and
   means for energizing said winding with a constant RMS alternating current of a fixed frequency sufficiently high for the losses in said magnetic core to cause the voltage across said winding in phase with the current to vary substantially linearly relative to the linear displacement of said magnetic core.

2. A transducer according to claim 1 wherein said winding is a single layer helical winding wound on a straight tubular former.

3. A transducer according to claim 2 wherein said magnetic core is a straight cylindrical metal rod which penetrates axially into the interior of said tubular former.

4. A transducer according to claim 1 wherein the frequency of said alternating current is fixed within the range 10 to 20 kHz.

5. A transducer according to claim 1 wherein a temperature sensing winding is disposed adjacent to said winding for the purpose of effecting temperature control of an output voltage derived from said voltage across said winding.

6. A transducer according to claim 1 wherein said winding is used in time-division multiplex for deriving said voltage across said winding, and for effecting temperature control of an output voltage derived from said voltage across said winding.

* * * * *